United States Patent [19]
Seki et al.

[11] Patent Number: 5,518,457
[45] Date of Patent: May 21, 1996

[54] BELT ADJUSTING DEVICE AND SINGLE FACER

[75] Inventors: Yukuharu Seki; Makoto Ando, both of Mihara; Kohshi Tanimoto; Kazukiyo Kohno, both of Hiroshima; Yoshiaki Maruyama, Hiroshima, all of Japan

[73] Assignee: Mitsubishi Jukogyo Kabushiki Kaisha, Japan

[21] Appl. No.: 308,579

[22] Filed: Sep. 19, 1994

[30] Foreign Application Priority Data

Mar. 23, 1994 [JP] Japan ..................................... 6-051854
Aug. 22, 1994 [JP] Japan ..................................... 6-196594

[51] Int. Cl.$^6$ ................................................... F16H 7/08
[52] U.S. Cl. .................................................... 474/102
[58] Field of Search ................................. 474/101–107

[56] References Cited

U.S. PATENT DOCUMENTS

| | | | |
|---|---|---|---|
| 4,286,706 | 9/1981 | Castelli et al. | 474/102 X |
| 4,527,686 | 7/1985 | Satoh | 474/102 X |
| 5,157,444 | 10/1992 | Mori et al. | 474/102 X |
| 5,344,520 | 9/1994 | Seki et al. | |

Primary Examiner—Michael Powell Buiz
Attorney, Agent, or Firm—Rothwell, Figg, Ernst & Kurz

[57] ABSTRACT

A single facer which includes a rotating corrugating roll for corrugating a medium; an endless belt for pressing a liner against the medium on the corrugating roll; at least a pair of belt rolls for running the endless belt; and a direction adjusting mechanism for changing the running direction of the endless belt with respect to the rotating shaft of the corrugating roll within the running plane of the endless belt to correct zigzag or sideway motion of the belt occurring while the belt is running; a detector for detecting sideway displacements of the endless belt; a computer for computing a positional correction to be made in the width direction based on a signal from the detector; and a controller for controlling the direction adjusting mechanism based on a value computed by the computer. In addition to the adjustment of the running direction of the endless belt, a tension balance between the opposite edges of the endless belt can be corrected by adjusting the relative angle between the shafts of the belt rolls.

14 Claims, 12 Drawing Sheets

BELT ADJUSTING DEVICE AND SINGLE FACER

BACKGROUND OF THE INVENTION

1. Field of the Invention

The present invention relates to a belt adjusting device for an endless belt set among a plurality of rolls, which device is configured so as to automatically correct the movement in the cross direction of the belt or the zigzag or meandering movement of the endless by correcting lengthwise shifts in the running direction of each side edge of the endless belt.

The present invention also relates to a single facer having a belt adjusting device which is configured so as to correct a zigzag or meandering movement of an endless belt in the cross direction and/or shearing deformation of the endless belt and resulting contraction of the belt width occurring as the endless belt runs applying bonding pressure on paper webs being processed.

2. Description of the Related Art

Conventionally, when manufacturing an endless belt which runs around a plurality of rolls in sequence into an endless form, it is very difficult to make the lengths of belt edges on opposite sides to be exactly the same dimension with high accuracy. Moreover, elongation of the belt occurs variably at right and left side edges over extended periods of use, or various factors such as slight inaccuracy of parallelism among the rolls at the time of manufacture may cause relative shifts between the two side edges of the belt. As a result, the endless belt 3 may move toward one side in the roll axis direction or tend to move in a zigzagging manner. With relative differences in the amount of running motion (lengthwise shifts) of the side edges of the belt, shrinkage of the belt width W in the cross direction may arise. This tendency of shrinkage is more expressed when the slip of the belt with respect to the rolls is less or, in other words, when the tension of the belt is higher.

A conventional method for correcting such tendency in dynamic belt motion has been to visually check the condition of the belt and then change the angle of the rotating shaft of some rolls to manually adjust the tension at each side edge of the belt.

With this conventional method, however, human attention is required frequently, and a high level of technical skill is needed in correcting the shift caused by various factors. Under these circumstances, some measures have been desired for easily correcting shifts in belt position at each side edge of the belt without human intervention.

On a single facer, corrugation is formed on a medium between a rotating corrugating roll 54 and another corrugating roll 54' engaging with each other, as shown in FIG. 17. Paste is applied to the top portions of corrugation on the corrugated medium, and a liner is bonded to the medium by pressing the liner against the medium by means of an endless belt 53 to produce a one-side corrugated fiberboard which has a flat surface on one side and a corrugated surface on the other side. The endless belt 53 is driven by at least a pair of parallel belt rolls 51 and 52.

FIG. 18 is a view for illustrating the occurrence of zigzag or sideway movement while a power-transmitting endless belt is running and a device for adjusting the zigzag movement. As described above, it is difficult to manufacture the endless belt 53, which runs around a plurality of belt rolls 51 and 52, so as to make the lengths of opposite side edges thereof to be exactly the same. Also, as the endless belt 53 is used over extended periods of time, two side edges of the belt become elongated differently or poor parallelism of the rolls 51 and 52 causes the endless belt 53 to shift in the cross direction (i.e., the direction along the roll axis) or move in a zigzagging manner while the endless belt 53 is running. As a result, not only the belt 53 collides with a housing 59, but also the manufacture of single-sided corrugated fiberboard at the edge portion cannot be done because the position of the belt 53 shifts beyond the width of the product.

To solve these problems, for endless belts in general, after the conditions of zigzag or sideway movement and shift are checked by eyes or by a detector, an adjustment is made by manually changing the tension of each side edge of the belt. This adjustment, which is made by an operator, is done by changing the direction of the rotating shaft of the roll 52 by means of a cylinder 56a or 56b in the plane in which the belt runs.

When such an adjusting method alone is applied to a single facer, however, deviations in relative movement between opposite side edges tend to occur easily because the belt is very wide relative to its length, unlike common endless belts. As a result, the belt width W decreases, or the life of the belt is shortened due to shear deformation in the plane of the belt. Also, for such a wide belt, the position of the belt on the roll tends to shift in the cross direction because there normally exist some differences in belt length between the side edge portions even if no relative differences in belt tension exist between the opposite side edge portions of the belt.

Therefore, on the single facer, in addition to the device for adjusting the tension of the side edge portion, a different type of devices have been desired for belt adjustment to solve the above-described problems inherent in the single facer.

SUMMARY OF THE INVENTION

An object of a first aspect of the present invention is to provide, in place of the conventional device in which the tension is corrected by manually adjusting the relative angle between the rotating shafts of the rolls after the belt condition is checked visually, a belt adjusting device which is configured so as to automatically correct such relative differences in belt tension between its opposite side edges.

An object of a second aspect of the present invention is to provide a single facer having a belt adjusting device which can correct a movement of the endless belt in the belt width direction, zigzag or sideway movement, and shear deformation such as shrinkage of belt width in the plane of the belt, considering the above-described problems inherent in the single facer.

Further, as third and fourth aspects of the present invention, the technique relating to the automatic adjusting device of an endless belt according to the first aspect is applied to the single facer according to the second aspect.

The belt adjusting device of the first aspect of the present invention includes detection markings located near opposite side edges of an endless belt set around a plurality of rolls; detectors for detecting the positions of the detection markings in the direction of belt run; a control unit which accepts outputs of the detectors; and a direction adjusting device for changing the direction of rotational axis of at least one of the rolls; wherein the detector detects a positional shift between opposite side edges of the belt in the direction of belt run, and the direction adjusting device is controlled by the control unit in accordance with outputs from the detectors in order to change the direction of the rotational axis of at least one of the rolls.

According to the first aspect of the present invention, a relative positional shift between opposite side edges of the endless belt can be detected in the running direction. If the shift of one side edge of the belt is forward with respect to the other side edge, the angle of the roll shaft direction is changed to increase the belt tension at the former side edge. Conversely, if the shift of one side edge is backward with respect to the other side edge, the belt tension of the former side edge is decreased. This adjustment is made by automatically operating the direction adjusting device for changing the direction of the rotational axis of the roll using feedback of the detection signals on the positional shifts of the belt. In this way, the belt keeps running without one side of the endless belt being advancing or retarding with respect to the other side, and the shrinkage of the belt width can be reduced or stopped.

The single facer in accordance with the second aspect of the present invention includes a rotating corrugating roll for corrugating a medium and for carrying the medium with paste being applied to top portions of corrugation thereof; an endless belt for pressing a liner against the medium on the corrugating roll; at least a pair of belt rolls for giving tension to the endless belt and for running the belt; and a direction adjusting mechanism for changing the running direction of the endless belt with respect to the plane perpendicular to the rotating shaft of the corrugating roll within the running plane of the endless belt to correct the zigzag movement in the width direction of the belt occurring while the endless belt runs.

According to the single facer of the second aspect of the present invention, the running direction of the endless belt can be deviated from the direction perpendicular to the rotational axis of the corrugating roll while the parallelism of the pair of belt rolls is substantially maintained.

According to the second aspect of the present invention, the direction adjusting mechanism may be formed by connecting the shaft ends of one pair of belt rolls by means of bridges on both right and left sides of the rolls, forming a supporting point on one of the bridges, and by tilting the pair of belt rolls together with respect to the rotational axis direction of the corrugating roll around the supporting point. To move the belt rolls and bridges around the supporting point, a suitable device, such as a hydraulic unit or a combination of a motor and a screw, can be utilized.

Alternatively, it is possible to connect the shaft ends of one pair of belt rolls by a bridge only on one side, and the belt rolls may be tilted with respect to the corrugating roll using opposite ends of rotating shafts on the other side as supporting points.

Alternatively, ends of the rotating shafts of a pair of belt rolls may be rotatably fixed on one side, a separate hydraulic cylinder is installed at the end of each rotating shaft on the other side, and the belt rolls may be simultaneously tilted with respect to the corrugating roll while the rolls are kept in parallel.

Also, a hydraulic unit may be installed at each shaft end on opposite sides of a pair of belt rolls, and the belt rolls may be tilted with respect to the corrugating roll by the displacement of all the shaft ends of the belt rolls. Thus, various different mechanisms may be used, and the above examples are by no means limiting to the scope of the present invention.

The single facer in accordance with a third aspect of the present invention includes a rotating corrugating roll for corrugating a medium and carrying the medium with paste being applied to top portions of corrugation thereof; an endless belt for pressing a liner against the medium on the corrugating roll; at least a pair of belt rolls for giving tension to the endless belt and for running the belt; and a direction adjusting mechanism for changing the running direction of the endless belt with respect to the plane perpendicular to the rotating shaft of the corrugating roll within the running plane of the endless belt to correct the zigzag movement in the width direction occurring while the endless belt runs; a detector for detecting displacement of the endless belt in the width direction; computing means for computing an amount of correction to be made in the position of the endless belt in the width direction on the basis of a signal from the detector; and a controller for controlling the aforementioned direction adjusting mechanism on the basis of a value computed by the computing means.

According to the single facer of the third aspect of the present invention, at least one pair of belt rolls among the rolls which are in contact with the endless belt are tilted with respect to the corrugating roll in the plane of these rolls, by which the endless belt can be moved in the width direction to automatically correct the zigzag movement. Therefore, not only the work load of operator can be reduced, but also the work which has depended on an operator's skill can be performed automatically.

Further, the fourth aspect of the present invention provides a single facer in which the adjustment of tension can be made at the right and left side edges of the belt in addition to the adjustment of the running direction of the belt with respect to the axial direction of the corrugating roll. For this purpose, a mechanism is installed to change the relative directions of the rotating shafts of the belt rolls with respect to each other. By this mechanism, a pair of belt rolls deviate from the parallel relationship therebetween.

One of adjusting mechanisms for correcting imbalance in belt tension between right and left edges of the belt is a device for changing the bridge length, such as a hydraulic unit, which can be installed on the bridge connecting the rotating shafts of the belt roll pair, so that the angle formed by the rotating shafts of the two belt rolls is adjusted. Also, the directions of the rotating shafts of two belt rolls are changed relatively by operating a moving device, which is installed on the rotating shaft of the belt roll, independently for each rotating shaft, by which imbalance in tension between the right and left edges of the belt can be adjusted.

According to the single facer of the fourth aspect, by the use of the above-mentioned belt adjusting device, at least one pair of belt rolls which give tension to the endless belt and run the belt are tilted relatively in the plane including these belt rolls, while the parallelism of the rolls is maintained, by which the angle with respect to the corrugating roll can be adjusted. Thereupon, the belt can be moved in the width direction on the belt roll. The shift or zigzag movement of the belt can be corrected.

According to the fourth aspect of the present invention, imbalance of belt tension between the right and left belt edges, in addition to the shift and zigzag movement of belt, can be corrected.

Also, by applying the automatic adjustment techniques discussed in the first and third aspects of the present invention, such adjustment can be made automatically without relying on the skills of an operator.

DETAILED DESCRIPTION OF PREFERRED EMBODIMENTS

Figure 1:
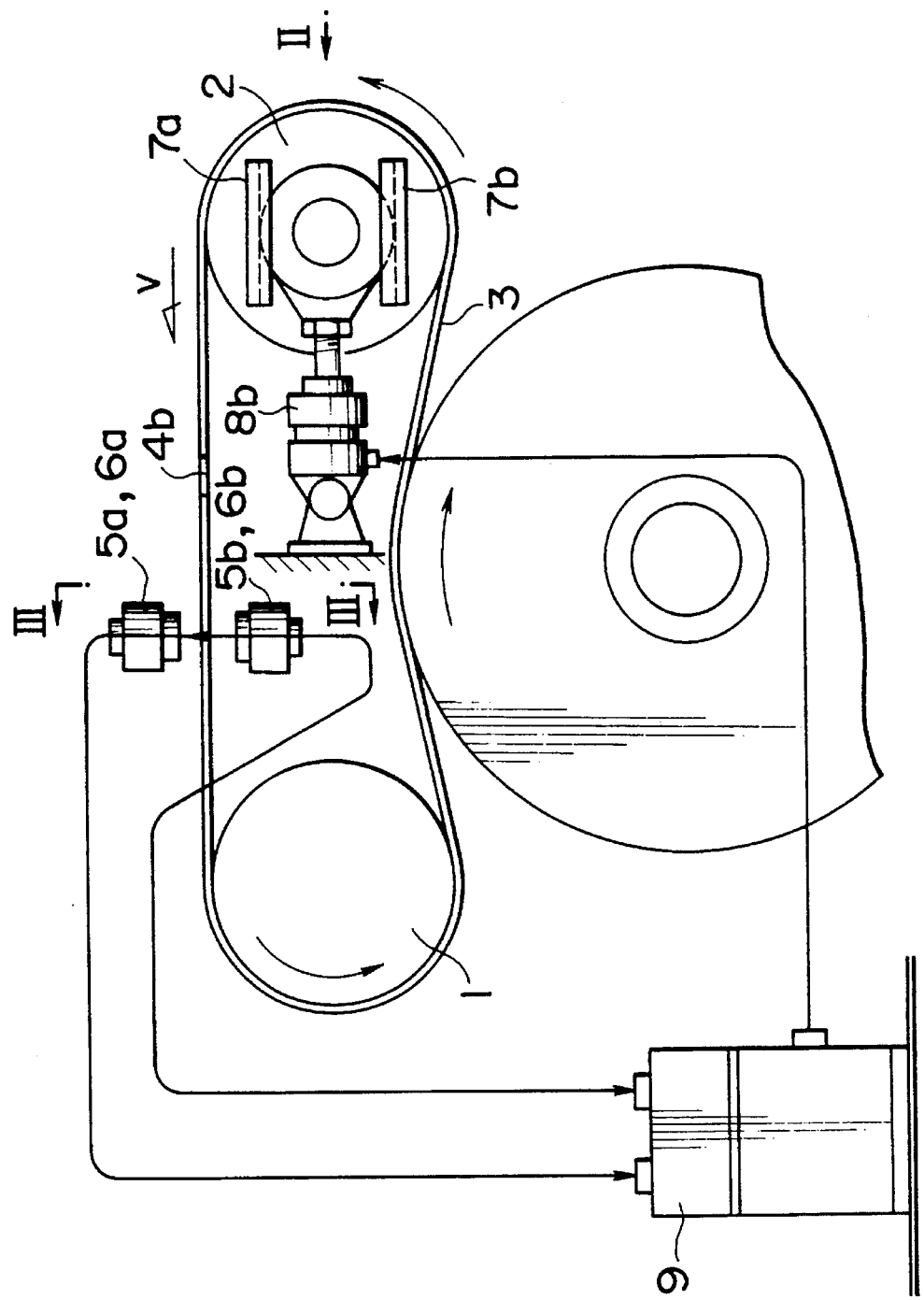
FIG. 1 is a side view of one embodiment of a belt adjusting device in accordance with the present invention.
Figure 2:
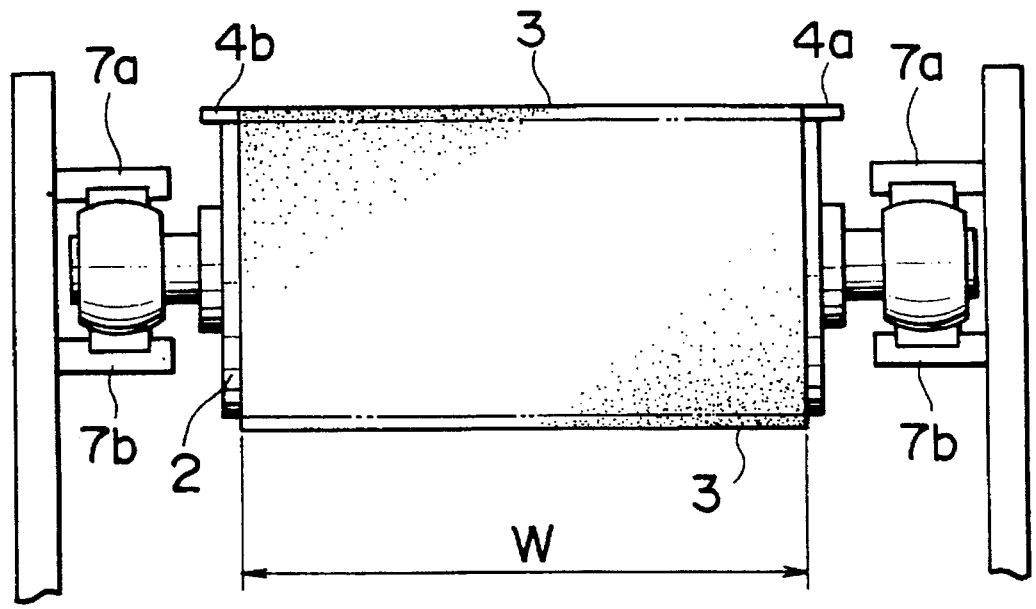
FIG. 2 is a front view of the belt adjusting device in accordance with the present invention.
Figure 3:
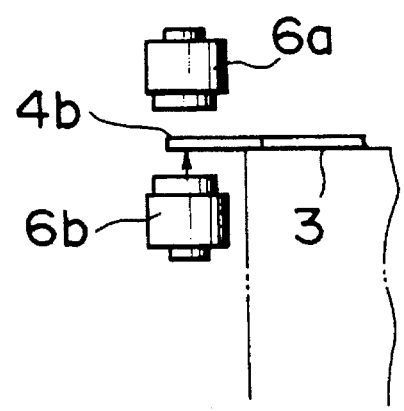
FIG. 3 is a view taken along line III—III and in the direction of arrows of FIG. 1.

First, an embodiment of the first aspect of the present invention will be described with reference to the drawings. FIG. 1 shows the embodiment of the first aspect of the present invention. The belt adjusting device shown in FIG. 1 has side protrusions 4a and 4b, as shown in FIG. 2, located at each side edge of an endless belt 3 running around a plurality of rolls 1 and 2 (two in FIG. 1) as detection markings. As shown in FIG.3 as well, detectors 5 and 6, which consist of a pair of transmission type photoelectric tubes, are installed at positions over and under the protrusions 4a and 4b of the belt 3.

In FIG. 1, the detectors 5 and 6, consisting of photoelectric tube systems 5a, 5b and 6a, 6b, are arranged to have right angles with respect to the belt running direction. The detectors 5 and 6 are positioned corresponding to the installation position of the protrusion 4. The relative installation position between the two photoelectric tube systems may be moved as long as they can detect relative lengthwise shifts between the two side edges of the belt.

One roll 2 of the rolls 1 and 2 is slidably supported by guides 7a and 7b at opposite ends of the rotating shaft of the roll 2, and pivotally mounted by the head portions of a pair of cylinders 8a and 8b. By the extension/retraction of the cylinder 8a and 8b, the angle of the rotating shaft of the roll 2, that is, the tension of each side edge of the endless belt, can be changed arbitrarily. The control unit 9 in FIG. 1 receives detection signals from the transmission type photoelectric tube detector systems 5 and 6, and operates a direction adjusting device for the rotating shaft of the roll 2.

Figure 4:
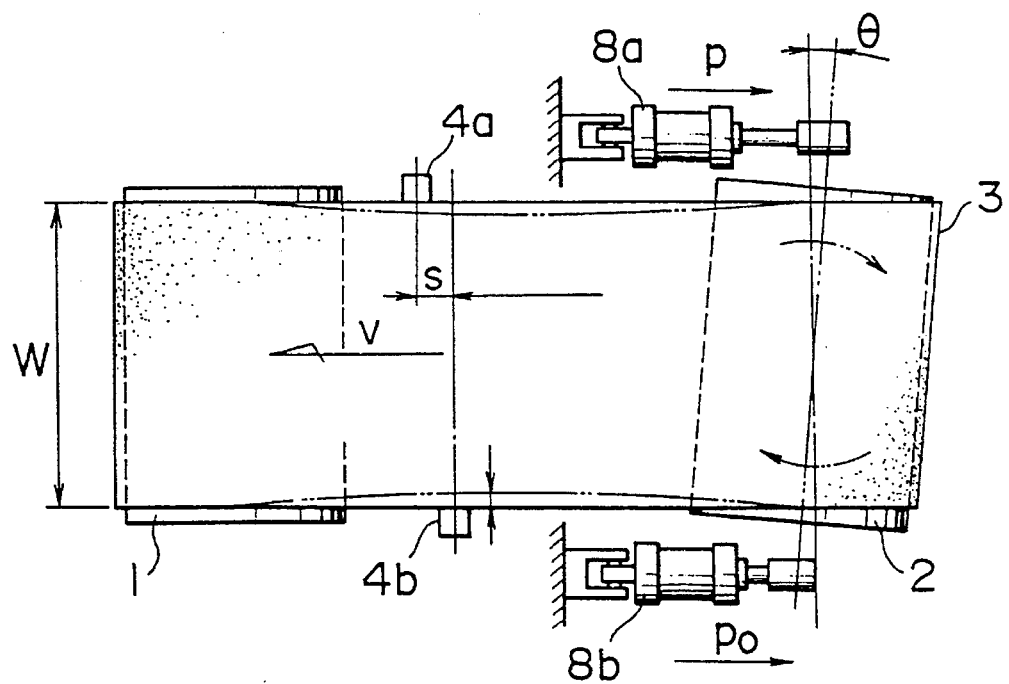
FIG. 4 is a plan view for illustrating an example of the control of the belt adjusting device shown in FIG. 2.

Next, the operation of the embodiment configured as described above will be described. FIG. 4 shows an example in which there is a relative delay on the left side (upper edge in the figure) of the endless belt 3 toward the running direction (left direction in the figure) with respect to the other side. When such a delay of the left side edge occurs, the pressure of the cylinder 8b, which mounts the left side end of the rotating shaft of the roll 2, is decreased, or conversely, the pressure of the cylinder 8a is increased, so that the direction (or the angle with respect to the other rotating shafts) of the rotating shaft of the roll 2 is changed to the state indicated by a double dotted line in FIG. 4 at angle θ, so that the tension on the left side of the belt 3 is decreased compared with the other side.

Figure 5:
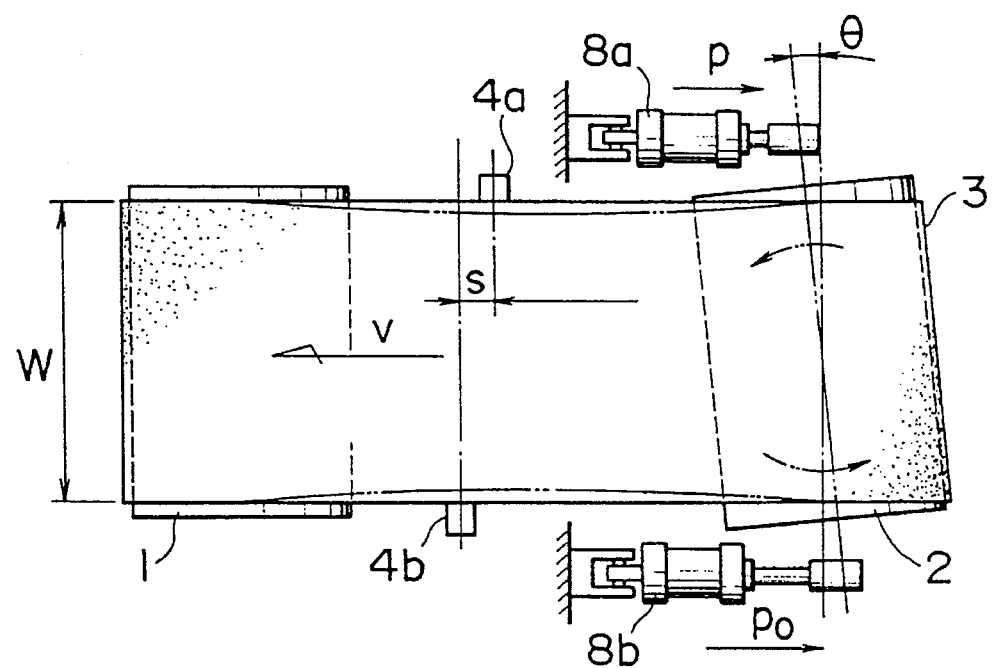
FIG. 5 is a plan view for illustrating an example of the control of the belt adjusting device shown in FIG. 2.

FIG. 5 shows an example in which the left side of the endless belt 3 toward the running direction advances relatively with respect to the other right side. When the left side advances, the angle of the rotating shaft of the roll 2 is changed to the state indicated by a double dotted line rotated at angle θ in FIG. 5 in the direction opposite to the case shown in FIG. 4, by which the tension on the left side of the belt 3 is increased relatively with respect to the tension on the right side. Such adjustments are made by the feedback of detection signals from the detectors 5 and 6, which detect the lengthwise shift of the right and left edges of the belt in the running direction, to the respective cylinders 8a and 8b, which function as a roll direction adjusting device, via the control unit 9, so as to actuate the cylinder 8a or 8b. That is to say, the adjustment can be made automatically by changing and adjusting the pressure added to the cylinders 8a and 8b.

Figure 6A:
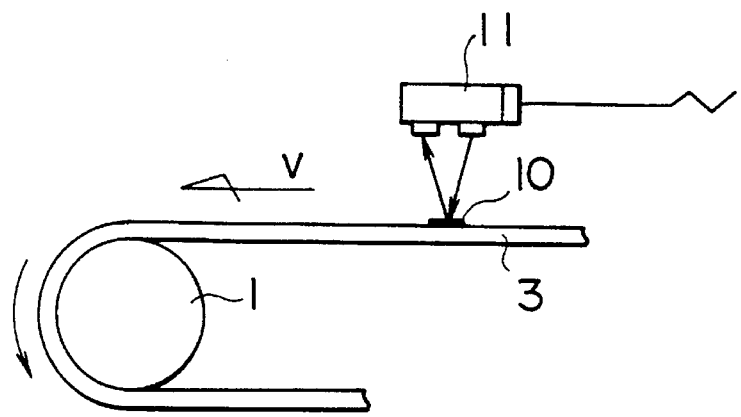
FIGS. 6A, 6B, and 6C are side views showing various methods for detecting the relative lengthwise shift of the right and left side edges of the belt in the running direction.
Figure 6B:
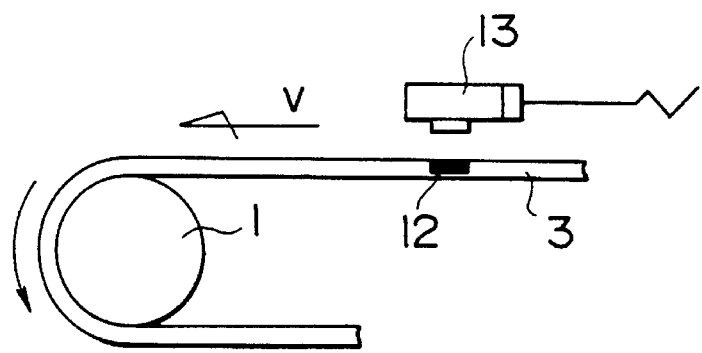
Figure 6C:
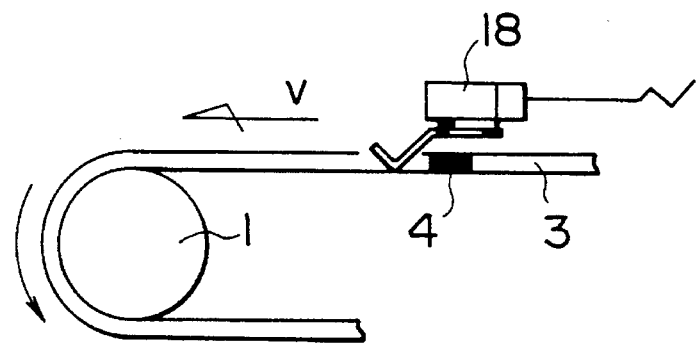
Figure 7:
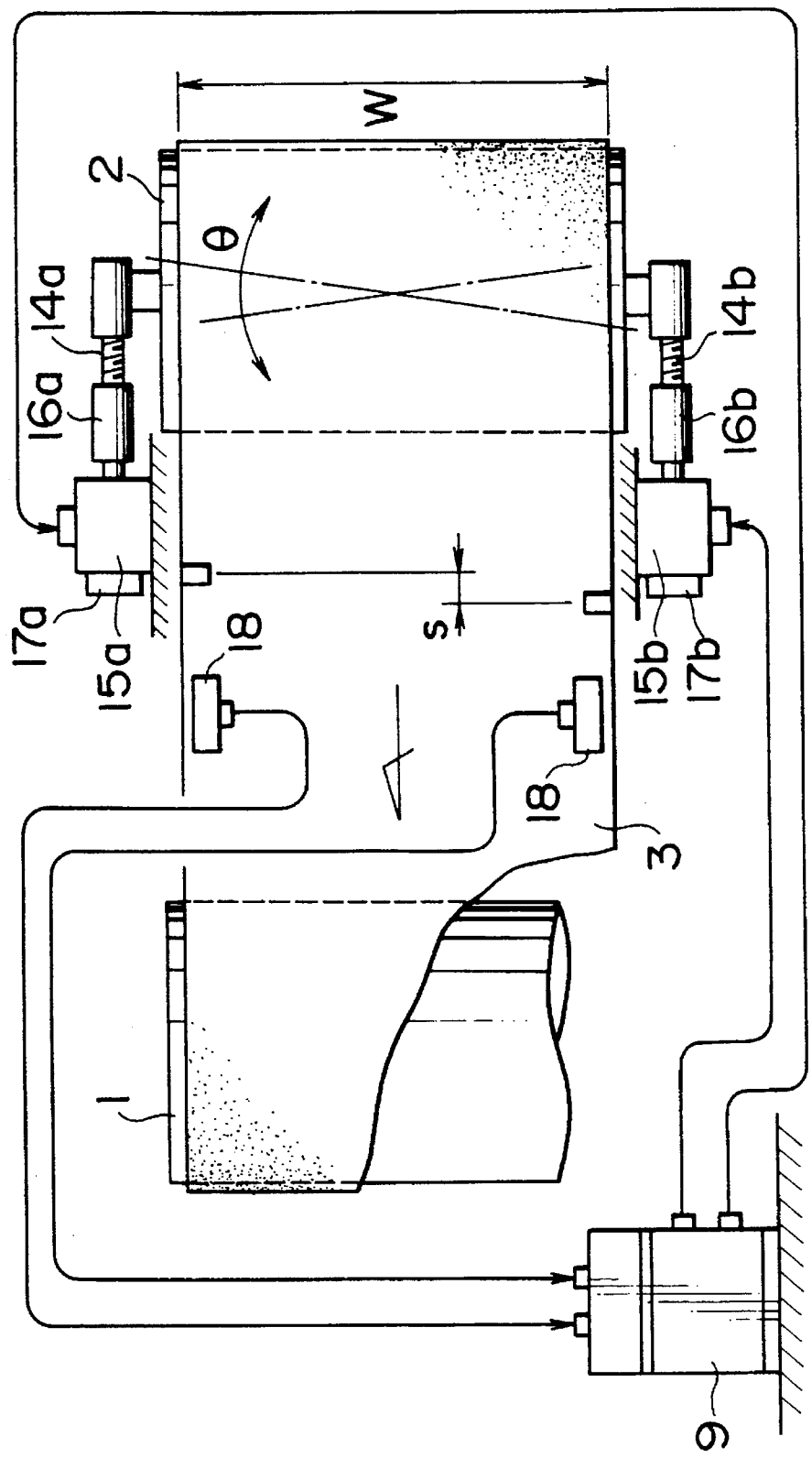
FIG. 7 is a plan view for illustrating another embodiment of a belt adjusting device in accordance with a first aspect of the present invention.

FIGS. 6 and 7 are views for illustrating another embodiment in accordance with the first aspect of the present invention. The configuration and operation of an adjusting device in accordance with this embodiment will be described briefly below. FIGS. 6A through 6C show examples of the methods for detecting the lengthwise shift of the right and left side edges of the endless belt in the running direction. The example shown in FIG. 6A is that lines 10 are printed or reflection sheets 10 are affixed at both side edges of the belt so that such detection marks 10 can be read via reflection type photoelectric tubes 11.

According to the example shown in FIG. 6B, metal wires or plates 12 are fixed to opposite side edges of the belt so that the position is detected by a proximity switch 13 or the like. Other examples include a method in which a detector which consists of a micro switch 18 or the like is operated by a detection member 4 protruding from the belt 3 to detect the position as shown in FIG. 6C.

The relative lengthwise positional shift (a distance) of opposite side edges of the belt is calculated by the equation $S = v \cdot t$, where v is the running speed of the belt, and t is the difference in detection times at which the reflection type photoelectric tubes 11a and 11b (suffixes a and b are to denote left and right, respectively, hereinbelow), the proximity switches 13a and 13b, etc. are operated. The shift direction can be determined by the operation sequence of the right and left detectors.

FIG. 7 shows a typical direction adjusting device of the rotating shaft of the roll 2 for running the belt 3 in accordance with the first aspect of the present invention. In this embodiment, the ends of the rotating shaft of the roll 2 are mounted onto the end of the right and left screws 14a and 14b, instead of the cylinders 8a and 8b in the above-described example. The screws 14a and 14b are fixed to the shaft end of the right and left motors 15a and 15b, respectively. By rotating screws 16a and 16b engaging with the screws 14a and 14b, the screws 14a and 14b are extended and retracted, so that the angle θ of the rotating shaft of the roll 2 can be changed arbitrarily.

In this embodiment, the movement distance L of the shaft end is controlled, instead of the pressurizing force (pneumatic pressure, hydraulic pressure, etc.) of the cylinders 8a and 8b as in the above-described example. The movement distance L can be determined by the equation L=p·N, where p is the pitch of the screw 14, and N is the number of revolutions of the motor 15. The number of revolutions of the motor 15 or the screw 16 can be measured easily by providing a rotation detector such as encoders 17a and 17b or the like. In FIG. 7, the data obtained from a detector 18 can be inputted to a control unit 9 in much the way as in the embodiment shown in FIG. 1.

The configuration and function of the first aspect of the present invention have been described above. The means for detecting the right and left lengthwise shifts of the endless belt 3 and the direction adjusting device of the rotating shaft of the roll are not limited to those described above. The present invention is by no means limited to these embodiments, and changes and variations may be made without departing from the spirit and scope of the invention.

As described above in detail, according to the first aspect of the present invention, each side of the endless belt may go forward or backward with respect to the other side because of various factors such as the manufacturing inaccuracy of the endless belt or inaccuracies inevitably occurring when assembling the rolls for running the belt. Such relative motional shifts of the belt in the running direction result in twisting distortions of the belt. The shift amount and direction are detected for each running cycle and fed back to the direction adjusting device of the rotating shaft of the roll or the tension adjusting device of the belt, so that the endless belt can always be returned and maintained at the central position on the belt rolls even if it tends to move sideways, and decreases in the belt width can be prevented. As a result, the belt can be operated accurately, and also manpower can be reduced because the need for an operator who corrects the movement of the endless belt can be eliminated.

Figure 8:
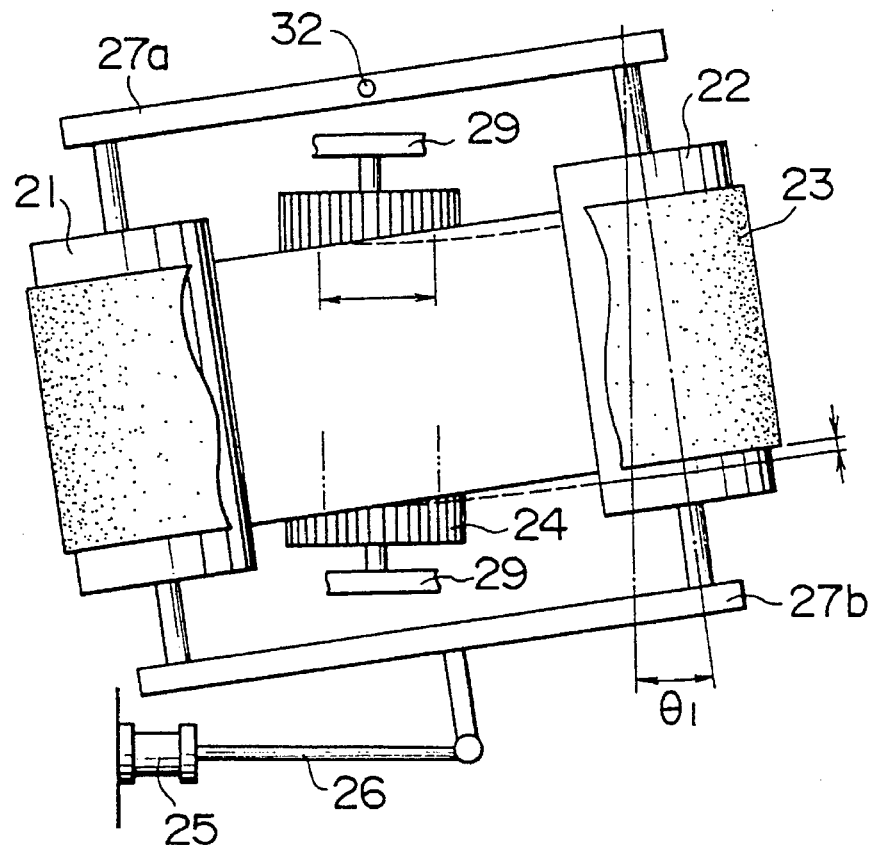
FIG. 8 is a schematic top plan view showing one embodiment of a single facer in accordance with the second aspect of the present invention.

FIGS. 8 to 11 show the basic configuration and function of a single facer in accordance with the second aspect of the present invention. In FIG. 8, a pair of belt rolls 21 and 22 supports and drives an endless belt 23, and presses the endless belt 23 against a corrugating roll 24. The bridges 27a and 27b connect the rotating shafts of the belt rolls 21 and 22. The angle adjusting cylinder 25 rotates the bridges 27a and 27b around the supporting point 32 via a link 26. Reference numeral 29 indicates a part of the housing of the single facer.

Figure 17:
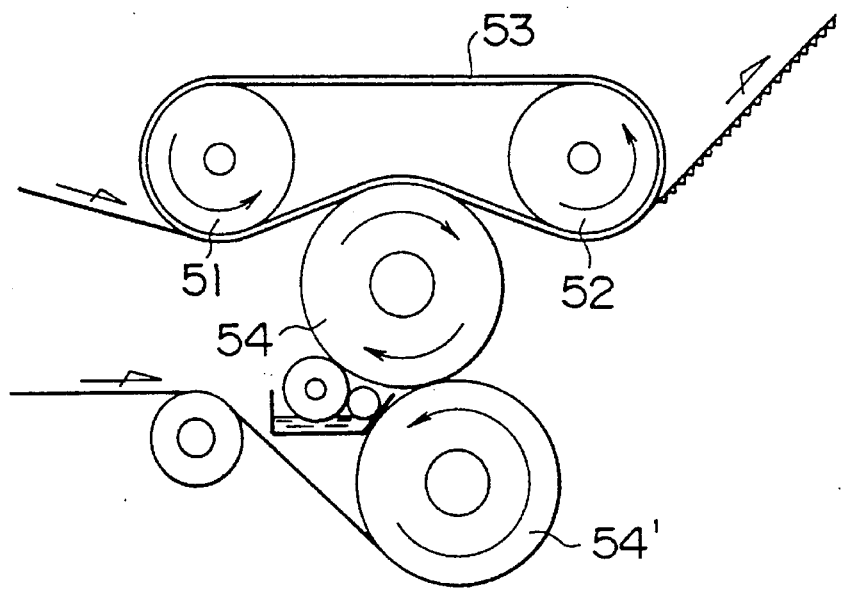
FIG. 17 is a side view of a conventional belt type single racer.
Figure 18:
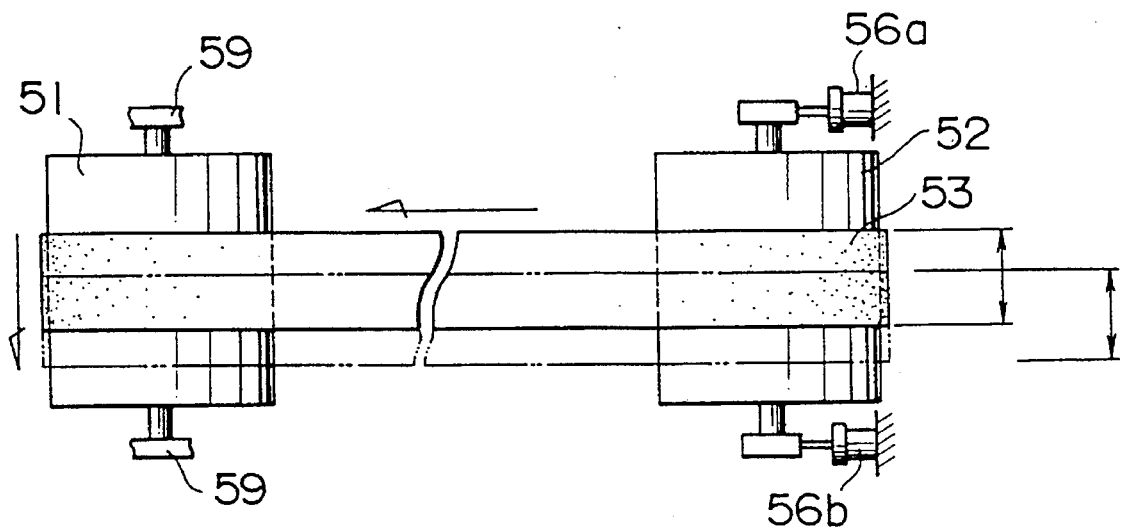
FIG. 18 is a plan view of a mechanism for adjusting an endless belt on the conventional single facet.

A liner is bonded, by means of the endless belt 23, to a medium which is corrugated by the corrugating roll 24 (as done by rolls 54 and 54' in FIG. 17) and to the top portion of which is applied paste, so as to form a one-side corrugated sheet. During this process, when zigzag movement of the endless belt 23 is detected, the angle adjusting cylinder 25 is operated so that the running direction of the endless belt 23 is tilted by an inclination angle $\theta_1$ of the running direction of the belt with respect to the direction perpendicular to the rotating shaft of the corrugating roll 24 within the plane including the rotating shafts of the belt rolls 21 and 22. In other words, a certain angle $\theta_1$ is formed between the rotating shaft of the corrugating roll 24 and the rotating shafts of the belt rolls 21, 22. Thus, the zigzag movement of the endless belt 23 is corrected. This correcting action will be described with reference to FIG. 9.

Figure 9:
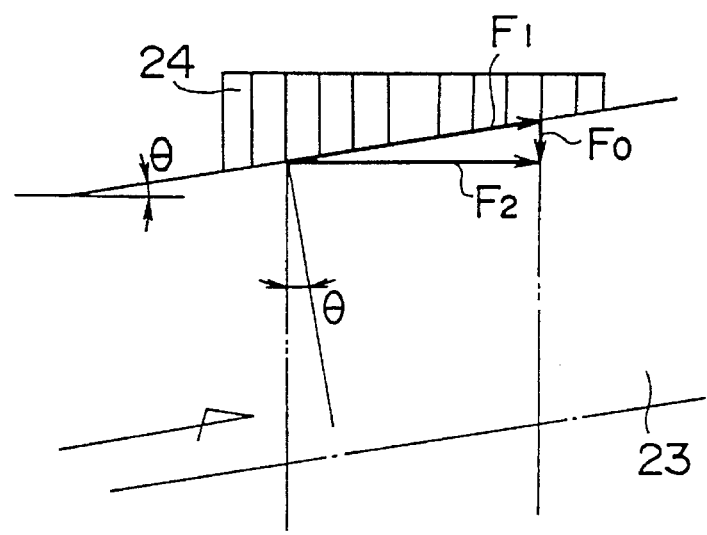
FIG. 9 is an enlarged view for illustrating the adjusting function of the endless belt in the embodiment shown in FIG. 8.

In FIG. 9, when the running direction of the endless belt 23 is tilted by an angle $\theta_1$ with respect to the direction perpendicular to the rotating shaft of the corrugating roll 24, a force $F_0$ in the axial direction of the corrugating roll is produced on the endless belt 23 by a force $F_1$ in the running direction and a force $F_2$ in the rotating direction caused by a frictional force between the corrugating roll 24 and the endless belt 23. This resultant force $F_0$ corrects the zigzag movement.

When the endless belt 23 begins to shift upward as shown in FIG. 8, the tilting of the belt rolls 21 and 22 with respect to the corrugating roll 24 results in a correcting force $F_0$ downward as shown in FIG. 9 so as to correct such movement. This force becomes larger as the contact surface pressure between the corrugating roll 24 and the endless belt 23, the contact area (contact length) between them, a coefficient of friction, and the tilt angle $\theta_1$ increase. Therefore, if sufficiently high values are given to these factors, the endless belt 23 in FIG. 8 moves downward, so that the position of the endless belt 23 is corrected.

Figure 10:
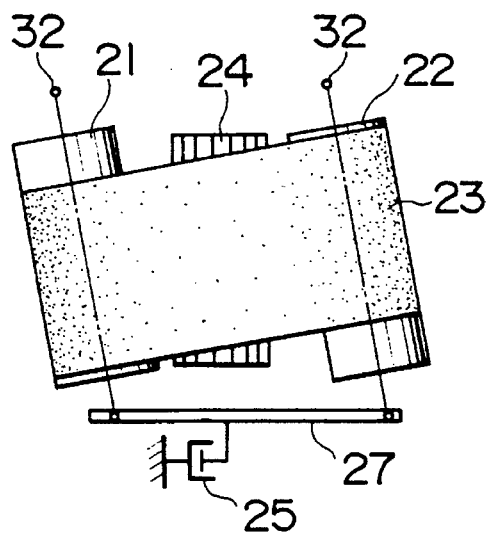
FIG. 10 is a schematic top plan view showing another embodiment in accordance with the second aspect of the present invention.
Figure 11:
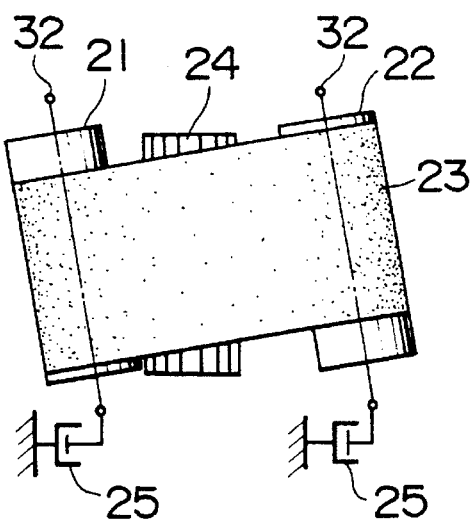
FIG. 11 is a schematic plan view showing further embodiment in accordance with the second aspect of the present invention.

FIGS. 10 and 11 show other means for providing an angle to the endless belt 23. In FIG. 10, one end of each of the rotating shafts of the belt rolls 21, 22 is mounted independently at the supporting point 32 rotatably within the running plane of the endless belt 23. The other ends of the rotating shafts of the belt rolls 21, 22 are connected together by a bridge 27, and the angle of the belt rolls 21, 22 with respect to the corrugating roll 24 is adjusted by moving the bridge 27 by means of an angle adjusting cylinder 25. In FIG. 11, one end of each rotating shaft of the belt rolls is mounted in the same as shown in FIG. 10, but the other ends are independently provided with angle adjusting cylinders 25. The angle adjusting cylinders 25 may be replaced with electromechanical means using a motor and a screw, or the like.

Figure 12A:
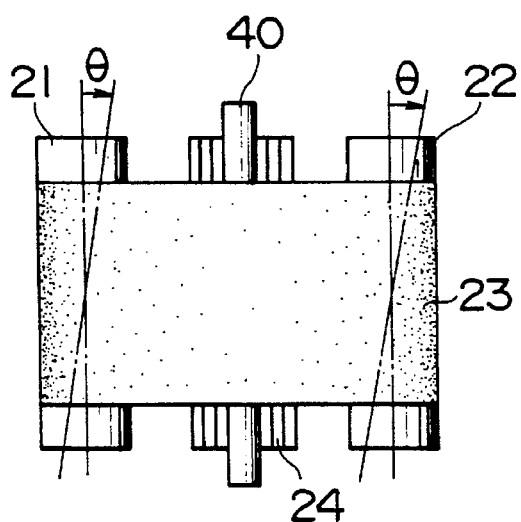
FIGS. 12A and 12B are schematic views showing a modification of the embodiment shown in FIGS. 8, 10, and 11.
Figure 12B:
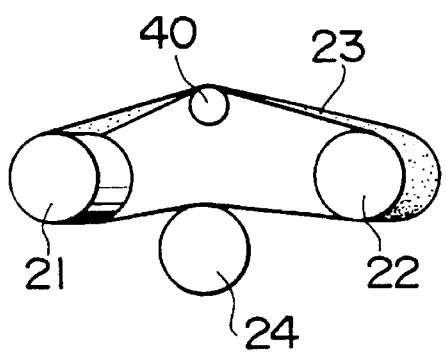

FIGS. 12A and 12B shows a configuration in which a roll 40 is installed in addition to a pair of belt rolls 21 and 22 for running the endless belt 23. Even if the number of rolls for guiding the endless belt 23 is increased, the above-mentioned correcting operation remains the same. In FIGS. 12A and 12B, the rotating shaft of the roll 40 is kept in parallel with the rotating shaft of the corrugating roll 24, independently of the direction of the pair of belt rolls 21 and 22. However, the roll 40 may also be tilted in association with the belt rolls 21 and 22 with the same effect.

Figure 13:
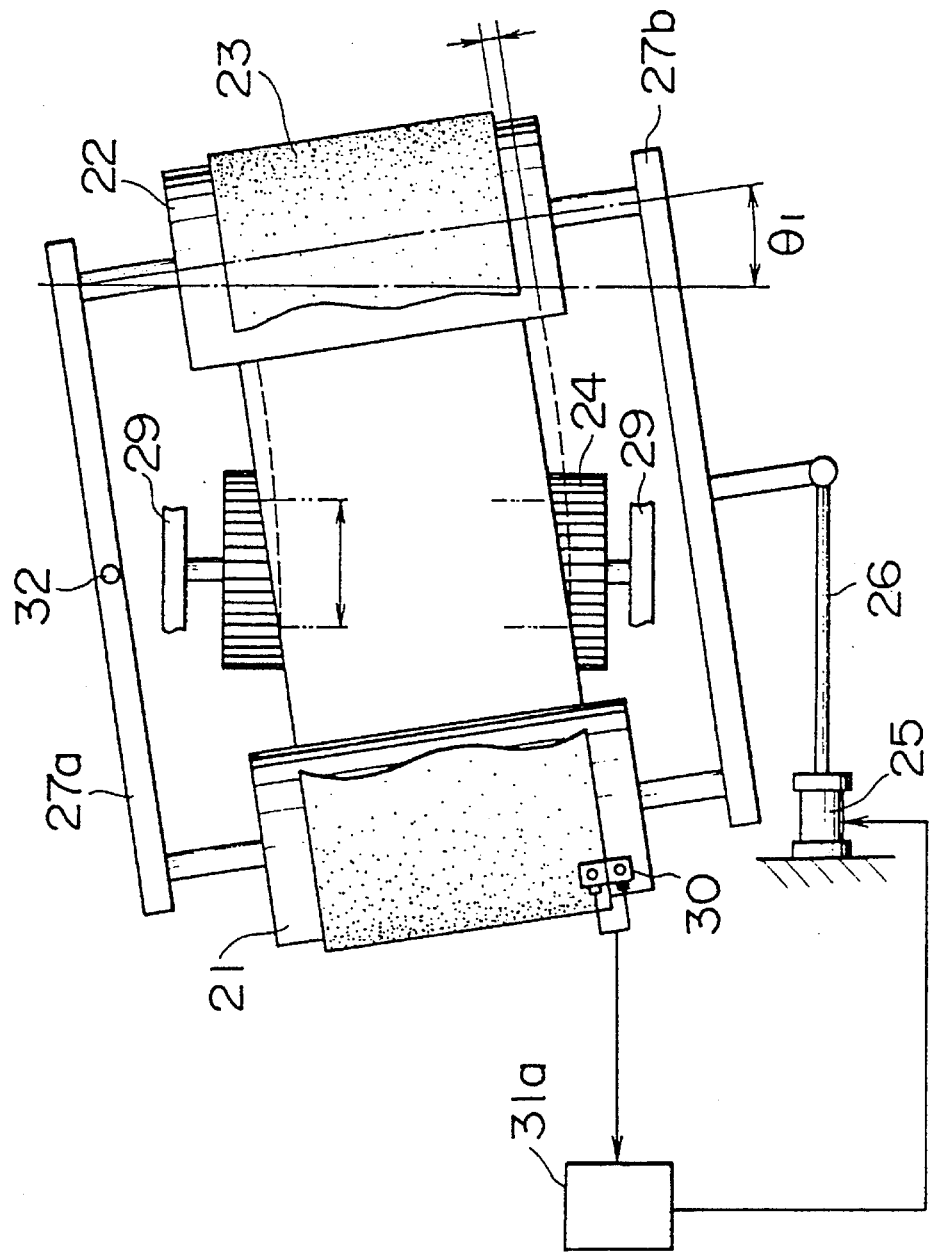
FIG. 13 is a schematic plan view showing one embodiment of a single facer in accordance with a third aspect of the present invention.

Next, one embodiment of a single facer in accordance with the third aspect of the present invention will be described. In this embodiment, an automatic control unit is added to the inclination angle adjusting means in the embodiment shown in FIG. 8. FIG. 13 shows the construction of this embodiment. Reference numerals 21–29, and 32 denote the same elements as those shown in FIG. 8, and the explanation of these elements is omitted. A zigzag movement detector 30 detects the positions of edge portions of the endless belt 23. This detector 30 uses conventionally known means such as a transmission type photoelectric tube to detect shifts of the endless belt 23 in the width direction. A control unit 31a controls an angle adjusting cylinder 25 on the basis of the signal given from the zigzag movement detector 30. This control unit 31a calculates a required amount of correction on the basis of the shift of the endless belt given from the zigzag movement detector 30, and generates a signal for operating the angle adjusting cylinder on the basis of the correction amount.

Figure 14:
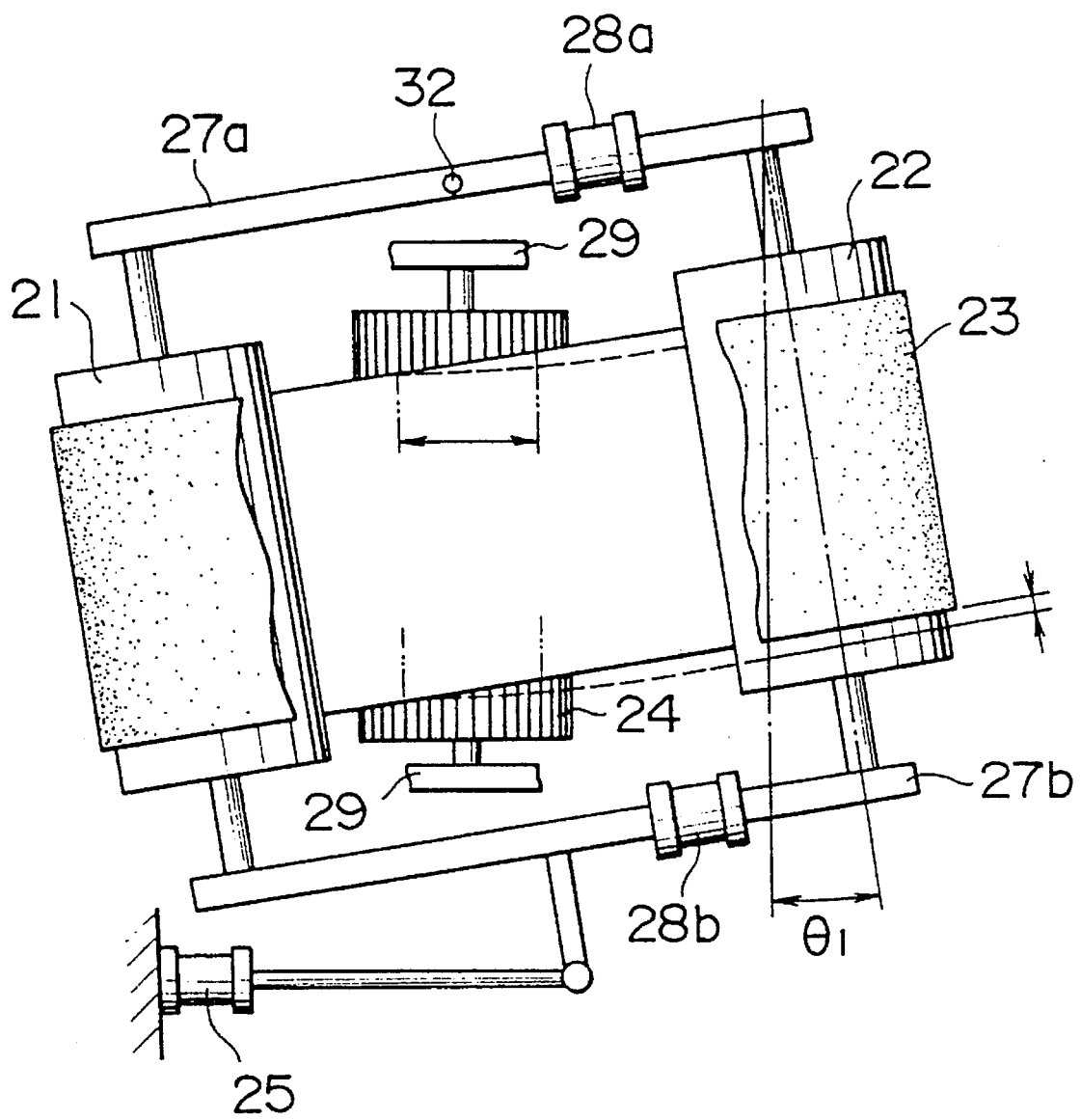
FIG. 14 is a schematic plan view showing another embodiment of a single facer in accordance with the fourth aspect of the present invention.

Next, an embodiment of the fourth aspect of the present invention in which belt tension adjusting means is added to the embodiment shown in FIG. 8. FIG. 14 shows this embodiment.

As described above, for an endless belt used in the single facer, the adjustment of tension imbalance between opposite side edges of the endless belt is desirable because such an endless belt has a particularly large width. Tension adjusting cylinders 28a, 28b are provided further to adjust the right and left balance of the belt tension.

In FIG. 14, tension at each side edge of the endless belt 23 is detected by conventional means (not shown), and tension adjusting cylinders 28a and 28b are operated manually or automatically on the basis of the detected tension value to adjust the tension of the endless belt 23. In this case, the zigzag movement adjustment is basically made independently of the tension adjustment. Specifically, with the positional relation of the belt rolls 21 and 22 being fixed after tension adjustment has been made, the angle adjusting cylinder 25 is operated to correct zigzagging movement. In this case, automatic control means shown in FIG. 13 may be incorporated. At this time, the positional relation of the rotating shafts of the belt rolls 21 and 22 should be parallel for the zigzag movement adjustment, but actually they are not always parallel because the tension adjustment has been made.

Here, for the detection of belt tension, detectors used for finding relative shifts between the two opposite sides of the endless belt in the running direction as shown in FIGS. 1–3 and 6 can also be sued.

Figure 15:
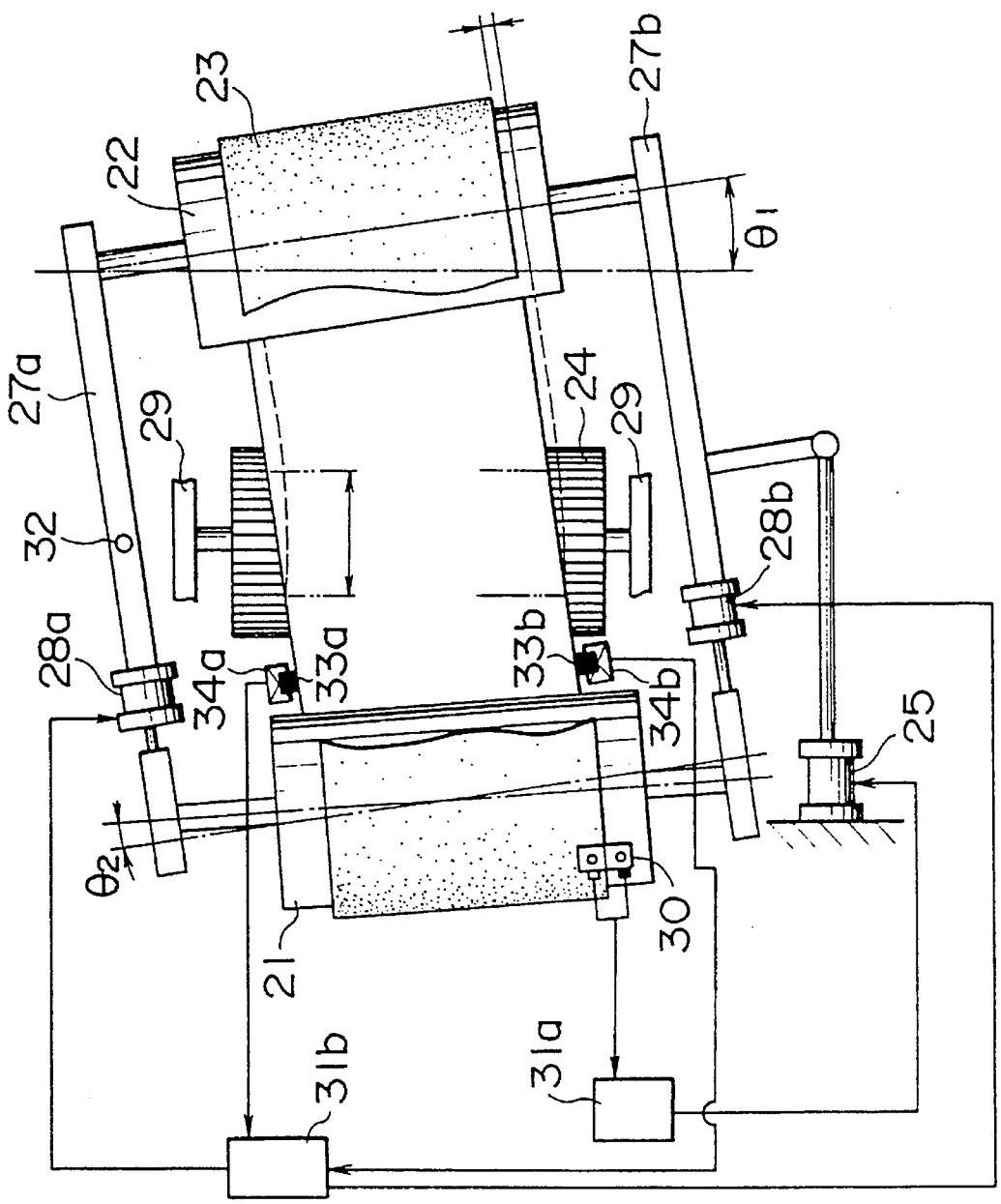
FIG. 15 is a schematic plan view showing a further embodiment of a single facer in accordance with the fourth aspect of the present invention.

Next, another embodiment of a single facer in accordance with the fourth aspect of the present invention will be described with reference to FIG. 15. This embodiment is provided with an automatic control system in which the zigzag movement adjustment and the tension adjustment of the endless belt 23 are performed independently. Comparing with the embodiment in FIG. 13, this embodiment is characterized by the addition of a tension adjustment mechanism and a tension adjustment control system. In FIG. 15, detection pieces, detection marks, etc. 33a and 33b (i.e., detection markings) are installed at both side edges of the belt 23, by which positional shifts in the running direction between the side edges of the belt are detected by transmission type photoelectric tubes 34a and 34b which serve as detecting means together with detection markings 33a and 33b. Then, hydraulic pressures to the right and left tension adjusting cylinders 28a and 28b are adjusted via a control unit 31b. In FIG. 15, the hydraulic pressure in the cylinder 28b is increased relatively with respect to the hydraulic pressure of the cylinder 28a to tilt the belt roll 21 with respect to the belt roll 22. The construction of the embodiment shown in FIG. 13 can be used in combination with the tension adjusting device shown in this embodiment. Various types of detection markings and detectors can be used in this embodiment; the present invention is not limited to the particular examples thereof.

Next, a further embodiment of the fourth aspect of the present invention will be described. In the construction of the embodiment in FIG. 15, after zigzag movements and/or correction required therefor, and positional shifts in the running direction between opposite side edges of the belt and/or correction required therefor are found, calculation is made using these values to determine desired amounts of correction.

As described above, a wide belt, such as an endless belt used in the single facer, is difficult to manufacture with sufficient accuracy to make its peripheral lengths exactly equal. For this reason, there is a tendency for the belt to move or meander transversely or to have relative shifts in the running direction between opposite side edges. Such a tendency is corrected according to the embodiment in FIG. 15 in the following manner: The position shift is corrected by the relative difference ΔP in tension given to one side edge with respect to the other edge, and the zigzag movement is corrected by a tilt angle $θ_1$ of the belt given with respect to the rotational axis of the corrugating roll. However, if a tension difference ΔP is given to correct the positional shift in the running direction between the two side edges of the belt, a zigzag movement sometimes occurs. If a belt tilt angle $θ_1$ is given to correct the zigzag movement, a position shift in the running direction sometimes occurs because the inclination angles given by two belt rolls deviate due to their accuracy or for other reasons.

In such a case, after zigzag movements and/or corrections required therefor, and positional shifts in the running direction between opposite side edges of the belt and/or corrections required therefor are found, calculation is made using these values so that the zigzag movements and positional shifts in the running direction fall within an allowable range, and the proper values for the belt tilt angle $θ_1$ and the tension difference ΔP of the side edges of the belt are determined.

Figure 16:
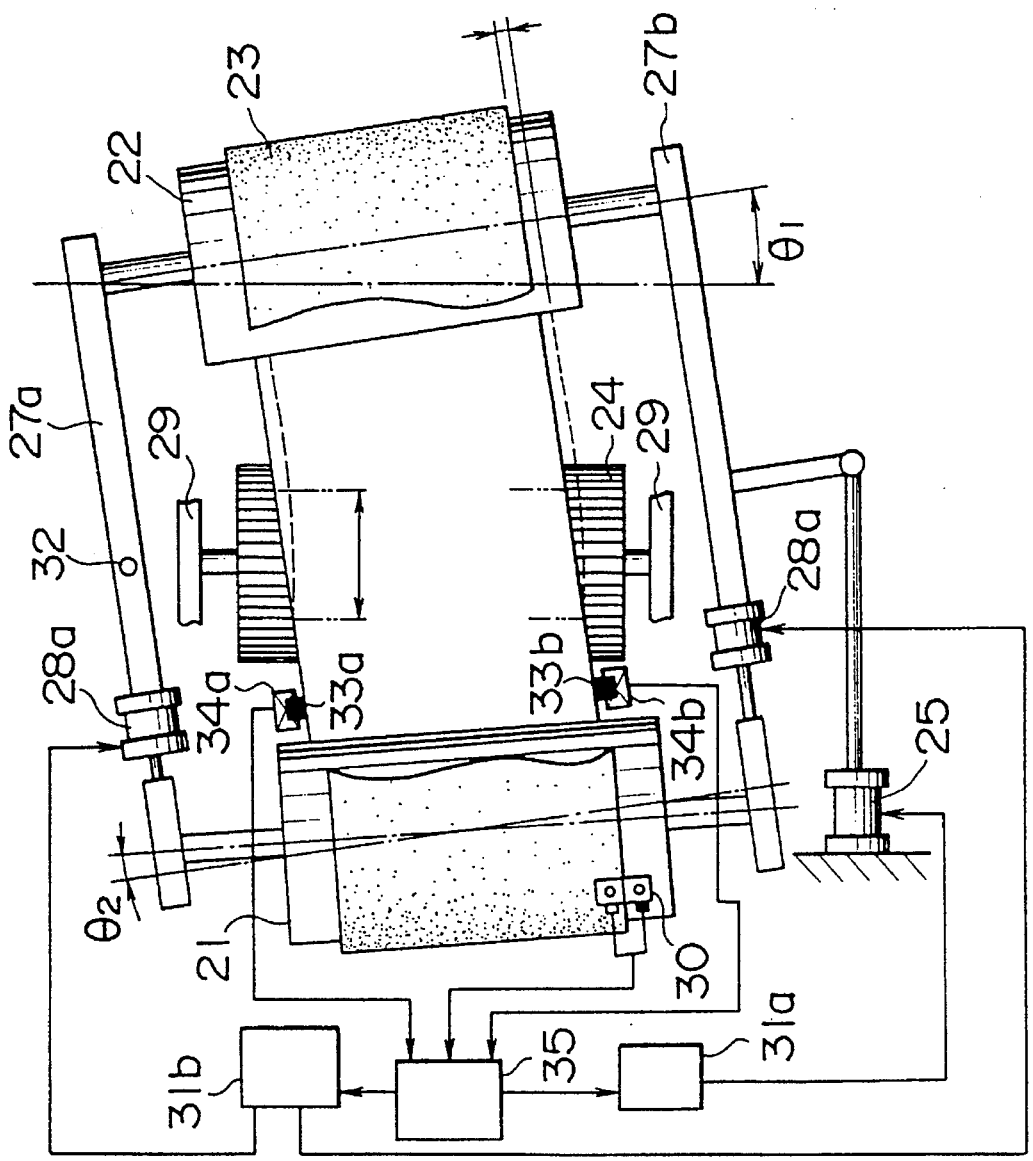
FIG. 16 is a schematic plan view showing a still further embodiment of a single facer in accordance with the fourth aspect of the present invention.

FIG. 16 shows the construction of such a single facer. Unlike the single facer shown in FIG. 15, signals from a transmission type photoelectric tube 30 for detecting sideway movements of the belt and transmission type photoelectric tubes 34a and 34b for detecting positional shifts in the running direction between the belt edges are once inputted to a computing device 35. Their correction amounts are determined by this computing device 35, and signals are sent to respective control units 31a and 31b to determine the belt angle $θ_1$ and the tension difference ΔP. Thereupon, even if the belt angle $θ_1$ and the tension difference ΔP affect the corrections of sideway movements of the belt and relative positional shifts between the two belt edges in an interrelating manner, the sideway movements and positional shifts can be corrected by means of the computing device.

As described above in detail, according to the single facer of the fourth aspect of the present invention, at least one pair of belt rolls of the rolls in contact with the endless belt are tilted with respect to the corrugating roll in the plane composed by these rolls, by which the endless belt can be moved in the width direction to correct the zigzag or sideway movement. By carrying out this control by using an automatic detecting device and a control unit, the effects of elimination of need for manpower and no dependence on operator's skill can be achieved.

We claim:

1. A belt adjusting device comprising: detection markings located near opposite side edges of an endless belt set around a plurality of rolls; detectors for detecting the positions of said detection markings in a belt running direction; a control unit for inputting outputs of said detectors; and a direction adjusting device for adjusting a direction of a roll rotating shaft which is installed on at least one of said rolls connected to said control unit, wherein said detector detects a positional shift between opposite side edges of said belt in the belt running direction, the direction adjusting device for the roll rotating shaft is controlled in accordance with outputs from said detectors in order to change a direction of the rotating shaft of at least one of said rolls.

2. A single facer comprising: a rotating corrugating roll for corrugating a medium and for carrying a medium with paste being applied to top portions of corrugation thereof; an endless belt for pressing a liner against said medium on said corrugating roll; at least a pair of belt rolls for giving tension to said endless belt and for running said belt; a detector arrangement providing output and positioned with respect to said endless belt for detecting zigzag movements in a width direction of the endless belt occurring as said endless belt runs; and a direction adjustment mechanism connected to said detector and to at least one of said belt rolls and controlled in accordance with output from said detector, for changing a running direction of said endless belt with respect to a plane perpendicular to a rotating shaft of said corrugating roll within a running plane of said endless belt to correct said zigzag movements in said width direction of the endless belt occurring as said endless belt runs.

3. A single facer according to claim 2, wherein said direction adjusting mechanism can change the running direction of said endless belt from a direction perpendicular to the rotating shaft of said corrugating roll while parallelism between said pair of belt rolls is substantially maintained.

4. A single facer according to claim 3, wherein said direction adjusting mechanism connects shaft ends of said at least one pair of belt rolls on both right and left sides of the belt rolls by means of bridges, one bridge having a supporting point, and said belt rolls are moved around said supporting point, so that the running direction of the belt has a nonzero angle with respect to the direction perpendicular to the rotating shaft of said corrugating roll.

5. A single facer according to claim 3, wherein said direction adjusting mechanism connects ends of rotating shafts of said at least one pair of belt rolls on only one side of the belt rolls by means of a bridge, and said belt rolls are moved around ends of rotating shafts on the other side which ends are rotatably fixed so as to act as supporting points, so that the running direction of the belt has a nonzero angle with respect to the direction perpendicular to the rotating shaft of said corrugating roll.

6. A single facer according to claim 3, wherein said direction adjusting mechanism rotatably locks the ends of the rotating shafts of said at least one pair of belt rolls on one side, a separate moving device is installed at the end of each rotating shaft on the other side, and said belt rolls are moved, so that the running direction of the belt has a nonzero angle with respect to the direction perpendicular to the rotating shaft of said corrugating roll.

7. A single facer according to claim 2, wherein said single facer is further provided with a tension adjusting mechanism for changing an angle between the rotating shafts of said pair of belt rolls to adjust relative tension between opposite side edges of said endless belt.

8. A single facer according to claim 7, wherein said tension adjusting mechanism comprises detection markings located near side edges of said endless belt; said detector arrangement comprising detectors for detecting positions of said detection markings in the belt running direction; a control unit for inputting outputs of said detectors; and a direction adjusting device for rotating shafts of the belt rolls installed on at least one of said rolls and connected to said control unit, by which said direction adjusting device for the rotating shaft of the belt roll is controlled to change the direction of the rotating shaft of said at least one roll.

9. A single facer according to claim 4, wherein at least one of said bridges has a length adjusting mechanism for changing the length of said bridge as a tension adjusting mechanism for adjusting tension balance between side edges of said endless belt.

10. A single facer according to claim 5, wherein said bridge has a length adjusting mechanism for changing the length of said bridge as a tension adjusting mechanism for adjusting tension balance between side edges of said endless belt.

11. A single facer according to claim 3, wherein said single racer further comprises a detector for detecting a displacement of said endless belt in a width direction; and a control unit for operating and controlling said direction adjusting mechanism in accordance with a positional correction in the width direction of said endless belt which is calculated on the basis of signals from said detectors.

12. A single facer according to claim 7, wherein said detector arrangement comprises a displacement detector for measuring a displacement of said endless belt on said belt roll in a width direction; and said single facer further comprises detection markings located near opposite side edges of said endless belt; position detectors for measuring a relative positional shift between said detection markings in the belt running direction; a direction control unit for operating said direction adjusting mechanism in accordance with a positional correction in the width direction of said endless belt, which is calculated on the basis of a signal from said displacement detector; and a tension control unit for operating said tension adjusting mechanism in accordance with outputs from said position detectors.

13. A single facer according to claim 12, wherein said direction and tension control units operate said direction adjusting mechanism and said tension adjusting mechanism in accordance with both said positional correction and said outputs from said position detectors.

14. A single facer according to claim 13, wherein functions of said direction and tension control units are incorporated into one control unit.

* * * * *